US012724690B1

(12) United States Patent
Patil et al.

(10) Patent No.: US 12,724,690 B1
(45) Date of Patent: Sep. 1, 2026

(54) QUALITY ANALYSIS AND SCORING FOR SOFTWARE DEVELOPMENT PROJECTS

(71) Applicant: Citibank, N.A., New York, NY (US)

(72) Inventors: Pranita Santosh Patil, Irving, TX (US); Richard Eric Lawton, Irving, TX (US); Mayank Vinayaka, Irving, TX (US); Cital Patel, Jersey City, NJ (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/415,664

(22) Filed: Dec. 10, 2025

(51) Int. Cl.
*G06F 8/10* (2018.01)
*G06F 11/3604* (2025.01)

(52) U.S. Cl.
CPC ............ *G06F 11/3608* (2013.01); *G06F 8/10* (2013.01)

(58) Field of Classification Search
CPC ............................... G06F 11/3608; G06F 8/10
See application file for complete search history.

(56) References Cited

U.S. PATENT DOCUMENTS 8,954,936 B2 * 2/2015 Bnayahu ............. G06F 11/3676 717/133
10,853,051 B2 * 12/2020 Saha .................. G06F 11/3698
12,498,947 B2 * 12/2025 Tworek ............... G06F 9/45508
2013/0067436 A1 * 3/2013 Bnayahu ............. G06F 11/3676 717/123
2020/0249929 A1 * 8/2020 Saha ......................... G06F 8/65
2021/0173642 A1 * 6/2021 Velayudham ............. G06F 8/71
2024/0411674 A1 * 12/2024 Zmigrod ............. G06F 11/3684
2025/0110855 A1 * 4/2025 Rudenko ................... G06F 8/35
2025/0370904 A1 * 12/2025 N ........................ G06F 11/3608
2025/0371210 A1 * 12/2025 Divine .................... G06F 30/20
2025/0377864 A1 * 12/2025 Dangi ....................... G06F 8/33

FOREIGN PATENT DOCUMENTS

CN 119671081 A * 3/2025
WO WO-2025072894 A1 * 4/2025 ............ G06N 20/00

* cited by examiner

*Primary Examiner* — Daxin Wu
(74) *Attorney, Agent, or Firm* — Perkins Coie LLP

(57) ABSTRACT

Systems, methods, and devices for error detection and remediation in software applications are disclosed. The system receives functional specifications and user requirement specifications for a software application. A prompt is generated for a generative machine learning model to output dynamic parameters that enable error detection within software elements during application generation phases. These dynamic parameters comprise application-specific rules based on the specifications. The prompt is input into the model to output dynamic parameters. Quality metrics are generated for software elements using these parameters, indicating conformity to specifications. Errors are detected when quality metrics show software elements fail to conform to requirements. Modifications are generated to remediate errors and then automatically implemented in the software elements.

20 Claims, 7 Drawing Sheets

160
Communication Subsystem 162
Machine Learning Subsystem 164
Dynamic Parameter Generation Subsystem 166
Error Detection and Remediation Subsystem 168
Operator Device 150
140
Repository 170
Application Programming Interface 132a
...
Application Programming Interface 132n
100

Figure 2:
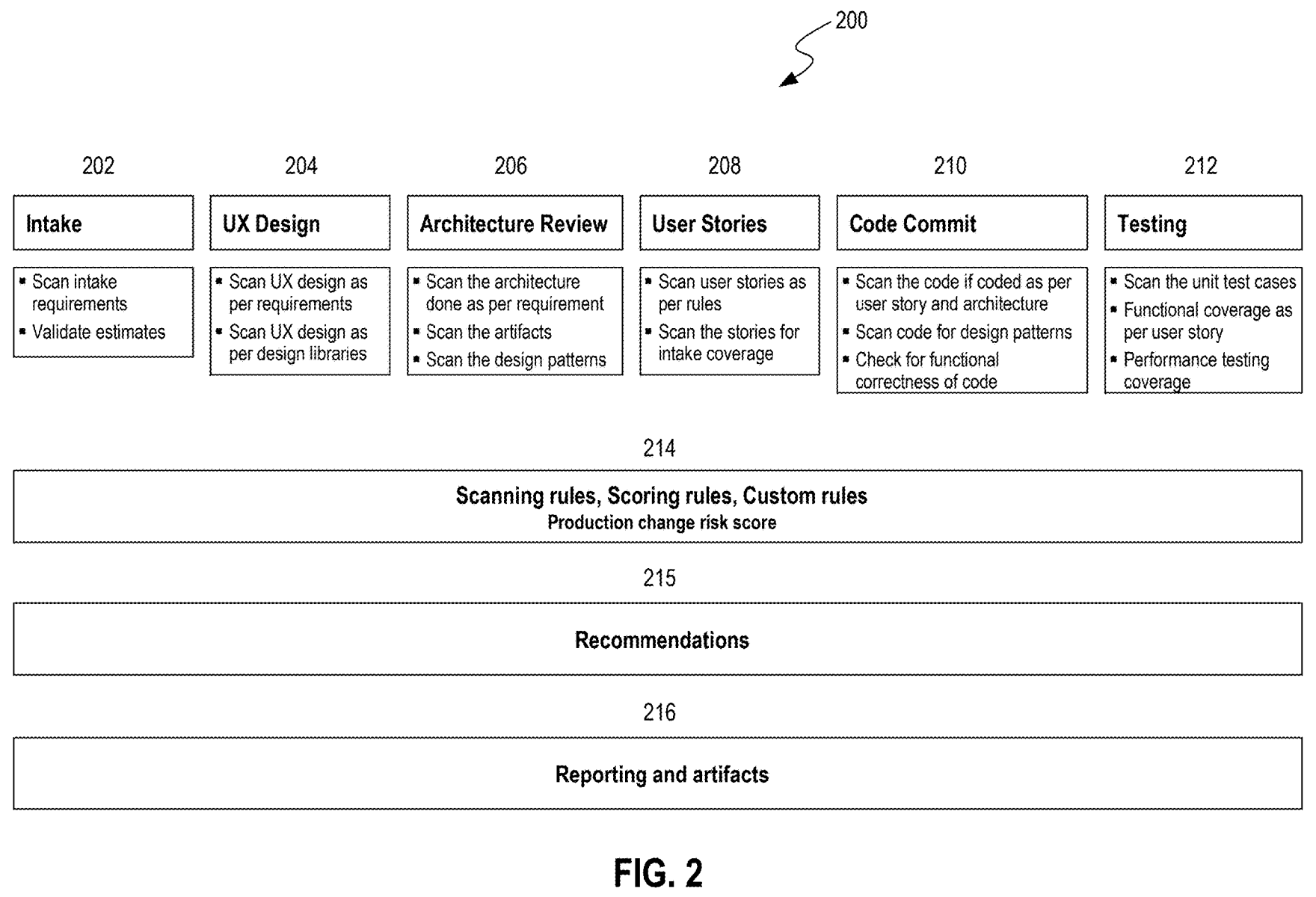

200

Intake 202
- Scan intake requirements
- Validate estimates

UX Design 204
- Scan UX design as per requirements
- Scan UX design as per design libraries

Architecture Review 206
- Scan the architecture done as per requirement
- Scan the artifacts
- Scan the design patterns

User Stories 208
- Scan user stories as per rules
- Scan the stories for intake coverage

Code Commit 210
- Scan the code if coded as per user story and architecture
- Scan code for design patterns
- Check for functional correctness of code

Testing 212
- Scan the unit test cases
- Functional coverage as per user story
- Performance testing coverage 214
Scanning rules, Scoring rules, Custom rules
Production change risk score 215
Recommendations

216
Reporting and artifacts

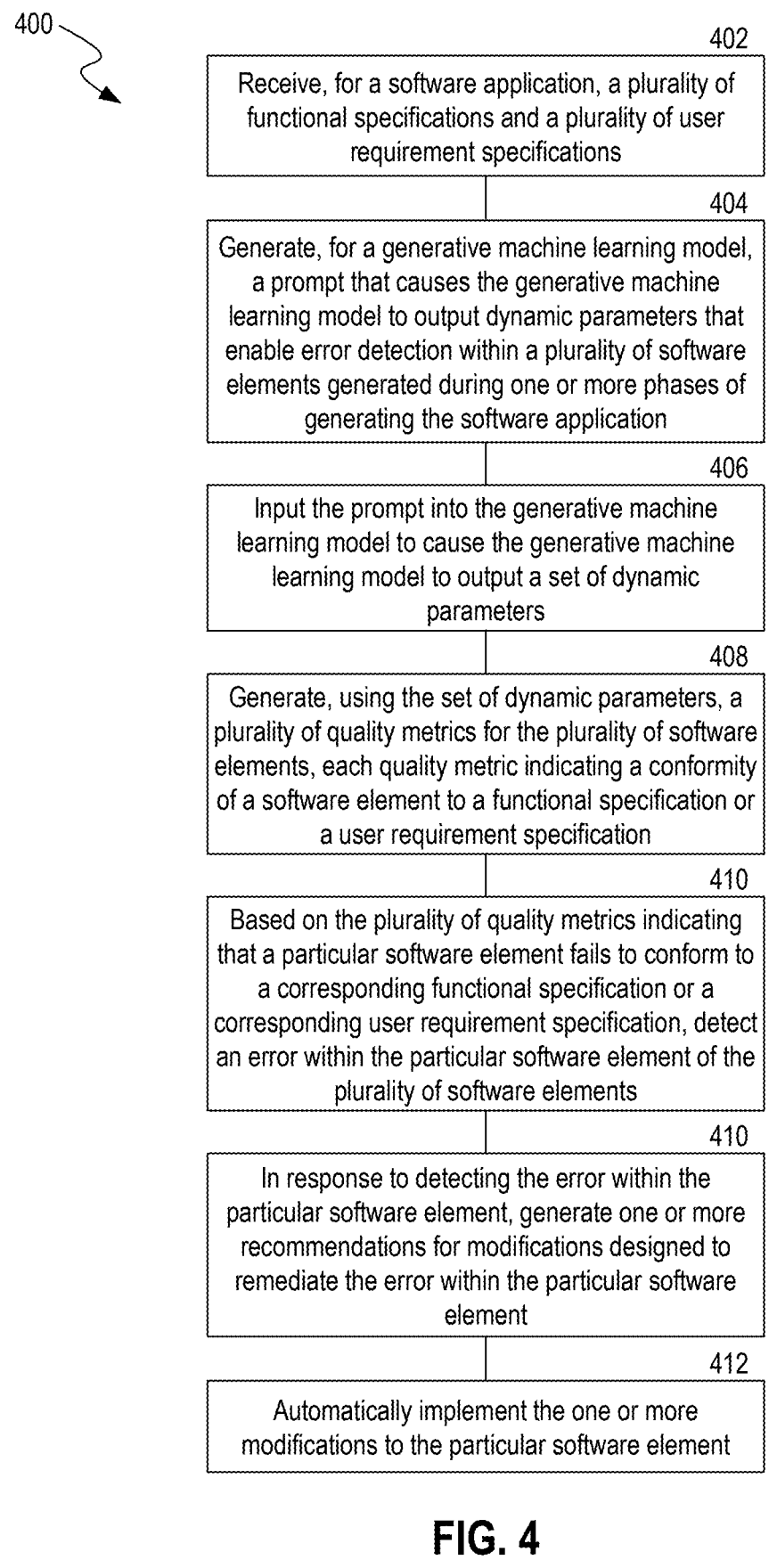

402
Receive, for a software application, a plurality of functional specifications and a plurality of user requirement specifications 404
Generate, for a generative machine learning model, a prompt that causes the generative machine learning model to output dynamic parameters that enable error detection within a plurality of software elements generated during one or more phases of generating the software application 406
Input the prompt into the generative machine learning model to cause the generative machine learning model to output a set of dynamic parameters 408
Generate, using the set of dynamic parameters, a plurality of quality metrics for the plurality of software elements, each quality metric indicating a conformity of a software element to a functional specification or a user requirement specification 410
Based on the plurality of quality metrics indicating that a particular software element fails to conform to a corresponding functional specification or a corresponding user requirement specification, detect an error within the particular software element of the plurality of software elements 410
In response to detecting the error within the particular software element, generate one or more recommendations for modifications designed to remediate the error within the particular software element 412
Automatically implement the one or more modifications to the particular software element

FIG. 4

QUALITY ANALYSIS AND SCORING FOR SOFTWARE DEVELOPMENT PROJECTS

SUMMARY

Software development projects face significant technical challenges in maintaining consistent quality across multiple phases of the development lifecycle. Current approaches to quality assurance in software development are fragmented and isolated, with each phase-such as intake requirements, user experience design, architecture review, user story creation, code development, and testing-being validated independently without consideration of how these phases relate to one another. This fragmentation creates substantial technical problems that conventional systems struggle to address effectively.

One of the technical challenges is the lack of systematic data exchange and communication protocols between different phases of the software development lifecycle. For example, code analysis tools may check for syntactic correctness and adherence to coding standards, but they may not access or process the semantic information from business requirements to perform functional validation that determines whether the code actually implements the specified business logic. Similarly, user experience design validation typically involves manual review processes where designers check against design libraries and standards, but there may be no data pipeline or interface mechanism to programmatically verify that the design specifications align with design libraries and maintain semantic consistency with the intake requirements or that subsequent user stories preserve the functional mappings defined in the design specifications.

Another significant technical problem is the lack of traceability between phases. When user stories are created from high-level intake requirements, there is no systematic way to verify that the stories provide complete coverage of the requirements or that they maintain consistency with the original specifications. This disconnect becomes more pronounced as the project progresses through architecture review, code development, and testing phases, where each subsequent phase may drift further from the original intent without detection.

The disclosed system addresses these technical challenges by providing a unified, automated approach to quality validation across all phases of software development. The system leverages generative artificial intelligence models to dynamically create validation parameters that assess diverse artifact types against both intake requirements and user specifications. This approach enables functional validation that goes beyond traditional syntactic checking to verify that each phase actually implements the intended functionality.

The system creates technical interconnections between previously isolated phases by maintaining traceability from initial requirements through final embodiment. When inconsistencies are detected between artifacts from different phases, the system may automatically generate modifications or recommendations for modifications to resolve these inconsistencies, ensuring that the entire development process remains aligned with the original specifications. This capability represents a substantial technical advancement over conventional approaches that require manual detection and resolution of cross-phase inconsistencies.

In particular, the disclosed system may receive, for a software application, a plurality of functional specifications and a plurality of user requirement specifications. For example, the plurality of functional specifications may include requirements for the software application, while the plurality of user requirement specifications may include user stories that define specific outcomes. This approach addresses the technical challenge of fragmented quality assurance processes by establishing a unified foundation for validation across all development phases.

The system may generate, for a generative machine learning model, a prompt that causes the generative machine learning model to output dynamic parameters that enable error detection within a plurality of software elements generated during one or more phases of generation of the software application. In particular, the dynamic parameters may include application-specific rules based on the plurality of functional specifications and the plurality of user requirement specifications. Moreover, the dynamic parameters may be used to detect errors within the plurality of software elements. This dynamic parameter generation represents a technical advancement over conventional static validation approaches, as it enables the system to create customized validation frameworks that adapt to specific project requirements rather than relying on predefined criteria.

The system may input the prompt into the generative machine learning model to cause the generative machine learning model to output a set of dynamic parameters. The system may then generate, using the set of dynamic parameters, a plurality of quality metrics for the plurality of software elements. In some embodiments, each quality metric may indicate a conformity of a software element to a functional specification of the plurality of functional specifications or a user requirement specification of the plurality of user requirement specifications. This quantitative assessment capability provides objective measures for evaluating software development progress and identifying areas requiring attention across different phases of the development lifecycle.

Based on the plurality of quality metrics indicating that a particular software element fails to conform to a corresponding user requirement specification, the system may detect an error within the particular software element of the plurality of software elements. In response to detecting the error within the particular software element, the system may generate one or more modifications or recommendations for modifications designed to remediate the error within the particular software element. For example, the system may generate the modifications or recommendations for modifications by prompting the generative machine learning model using the set of dynamic parameters and the particular software element. The system may then automatically implement the one or more modifications to the particular software element. This comprehensive error detection and remediation capability facilitates continuous improvement and alignment throughout the development process while maintaining consistency with project specifications.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF FIGURES

FIG. 2 illustrates a review process for quality analysis of software development phases, in accordance with some implementations of the present technology.

FIG. 4 illustrates a flowchart of a process for automated quality analysis and scoring of software development projects, in accordance with one or more implementations of this disclosure.

Figure 1:
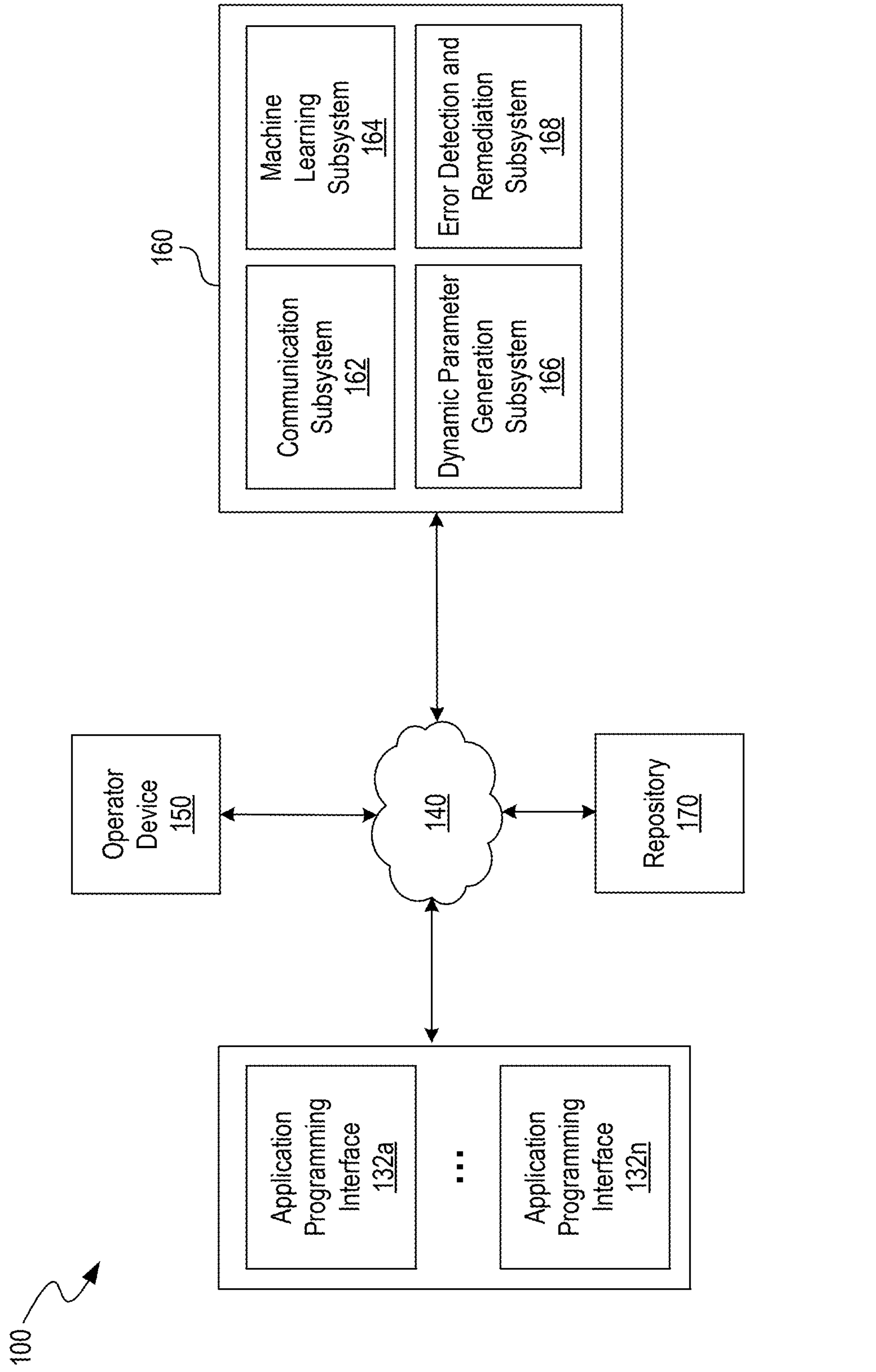
FIG. 1 illustrates a system for quality analysis and scoring of software development projects, in accordance with one or more implementations of this disclosure.

The technologies described herein will become more apparent to those skilled in the art from studying the Detailed Description in conjunction with the drawings. Embodiments describing aspects of the invention are illustrated by way of example, and the same references may indicate similar elements. While the drawings depict various embodiments for the purpose of illustration, those skilled in the art will recognize that alternative embodiments may be employed without departing from the principles of the present technologies. Accordingly, while specific embodiments are shown in the drawings, the technology is amenable to various modifications.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to software development quality analysis and validation.

FIG. 1 shows an illustrative system 100 for quality analysis and scoring of software development projects, in accordance with one or more implementations of this disclosure. For example, the illustrative system 100 may be used to process software development artifacts through a combination of generative AI models and dynamic validation parameters. In some embodiments, the illustrative system 100 may utilize techniques such as dynamic parameter generation, cross-phase validation, and automated error remediation in order to perform comprehensive quality analysis across software development phases. For example, the illustrative system 100 may include a quality analysis system 160 that is able to perform comprehensive software development validation operations. The quality analysis system 160 may include software, hardware, or a combination of the two. For example, the quality analysis system 160 may be a physical server or a virtual server that is running on a physical computer system. In some embodiments, the quality analysis system 160 may be configured on a user device (e.g., a laptop computer, a smartphone, a desktop computer, an electronic tablet, or another suitable user device) and configured to execute instructions for analyzing software development artifacts using generative models operating according to dynamic validation parameters. In particular, the quality analysis system 160 may include several subsystems, each configured to perform one or more steps of the methods described herein, such as a communication subsystem 162, a machine learning subsystem 164, a dynamic parameter generation subsystem 166, and an error detection and remediation subsystem 168.

As described herein, the quality analysis system 160 may obtain data to determine the appropriate validation parameters for software development quality analysis tasks. The quality analysis system 160 may retrieve data or sources of data from databases or data stores. In some embodiments, the quality analysis system 160 may retrieve data or sources of data from a repository 170, discussed in greater detail below. As described herein, a quality analysis system may be any system (e.g., computer, device, node, etc.) that is enabled to execute one or more tools for analyzing software development artifacts or enabled to execute tasks for which validation data may be passively collected. The quality analysis system 160 may be configured to receive the data via a communication network 140 at the communication subsystem 162. The communication network 140 may be a local area network (LAN), a wide area network (WAN; e.g., the internet), or a combination of the two. The communication network 140 may connect the communication subsystem 162 to one or more user devices, such as user device 132*a*-132*n*. The communication subsystem 162 may include software components, hardware components, or a combination of both. For example, the communication subsystem 162 may include a network card (e.g., a wireless network card or a wired network card) that is associated with software to drive the card. The communication subsystem 162 may pass at least a portion of the data, or a pointer to the data in memory, to other subsystems, such as the machine learning subsystem 164, the dynamic parameter generation subsystem 166, and the error detection and remediation subsystem 168.

According to some implementations, the quality analysis system 160 may obtain such data by generating one or more commands to execute software validation operations. In some examples, the command(s) may specify a specific timeframe for obtaining the data (e.g., explicitly by identifying the timeframe via a start and an end time or implicitly by requesting data from a current development phase). Additionally, the illustrative system 100 may include the repository 170, which may store historical validation data, stored artifacts, machine learning model parameters, and system commands. Artifacts may include any deliverable, document, file, component, or output produced during the software development lifecycle. For example, artifacts may include requirements documents, design specifications, architecture diagrams, user stories, source code files, test cases, configuration files, deployment scripts, user interface mockups, wireframes, technical documentation, or any other tangible or digital work product created or modified during software development phases.

In some embodiments, the repository 170 may store preconfigured commands related to analyzing software development artifacts using dynamic validation parameters, which may be used by the quality analysis system 160 to manage validation processes dynamically. The repository 170 may also include metadata or tags associated with stored data, such as identifiers, policies, or patterns. The quality analysis system 160 may retrieve data from the repository 170 to refine its validation processes, optimize quality scores, and improve the accuracy of software development artifact analysis. Additionally, the repository 170 may store standardized validation parameters used to update the quality analysis model based on newly collected data, ensuring adaptive and evolving software development quality assessment.

The illustrative system 100 may further include an operator device 150, which may receive alerts generated by the quality analysis system 160 when a software development artifact requires review or when quality scores indicate high levels of nonconformity in certain development phases. The operator device 150 may be a desktop computer, a mobile device, or other suitable interfaces through which an operator may review validation results and monitor outcomes, such as low quality scores or inconsistent artifacts across development phases. The quality analysis system 160 may transmit structured validation results to the operator device 150 to provide insight into software development quality analysis and supporting evidence.

The disclosed technology provides a system and method for quality analysis and scoring of software development projects using generative artificial intelligence models and dynamic validation parameters. In particular, systems and methods described herein involve receiving functional specifications and user requirement specifications for software applications, generating dynamic validation parameters through generative machine learning models, and performing comprehensive quality analysis across multiple phases of software development lifecycles. The system addresses the technical challenge of fragmented quality assurance processes by creating interconnected validation mechanisms that trace requirements through design, architecture, coding, and testing phases. Specifically, the present disclosure will be directed to using generative models to create project-specific validation rules, implementing cross-phase consistency checking, detecting errors through quality metric analysis, and automatically generating modifications to remediate identified issues. The system may implement dynamic parameter generation that enables functional validation beyond traditional syntactic checking, providing quantitative quality scores and production confidence metrics for software deployment decisions.

FIG. 2 illustrates a review process 200 for quality analysis of software development phases, in accordance with some embodiments of the present technology. The process 200 provides a comprehensive framework for automated quality validation across the entire software development lifecycle, addressing the technical challenge of fragmented quality assurance processes that currently operate in isolation. The process 200 includes multiple phases arranged sequentially, including an intake phase 202, a UX design phase 204, an architecture review phase 206, a user stories phase 208, a code commit phase 210, and a testing phase 212. Each phase is interconnected through a unified validation system that maintains traceability from initial requirements through final implementation. The process 200 implements a sophisticated rules-based validation system that includes scanning rules, scoring rules, and custom rules 214 that are applied across all phases. These scanning rules, scoring rules, and custom rules 214 are dynamically configurable and may be tailored to specific project requirements, organizational standards, and regulatory compliance needs. The system calculates a production change confidence score that aggregates quality metrics from all phases to provide a quantitative assessment of deployment readiness. For example, if the intake phase 202 scores 85%, UX design phase 204 scores 92%, architecture review phase 206 scores 78%, user stories phase 208 scores 88%, code commit phase 210 scores 90%, and testing phase 212 scores 95%, the system may calculate a weighted production change confidence score that considers the criticality of each phase.

The process 200 further includes recommendations 215, which can include recommended modifications to resolve functionality that provides users with actionable guidance for improving software development quality across all phases. The recommendations component analyzes validation results from each phase and generates specific, targeted suggestions for addressing identified deficiencies or inconsistencies. For example, if the intake phase 202 identifies incomplete requirements documentation, the recommendations may suggest specific templates or checklists to ensure comprehensive requirement capture. Similarly, if the UX design phase 204 detects violations of design library standards, the recommendations may provide specific guidance on proper component usage and accessibility compliance. The recommendations functionality leverages historical project data and best practices to provide contextually relevant suggestions that align with organizational standards and industry best practices. Moreover, the recommendations are prioritized based on their potential impact on overall project quality and deployment readiness, enabling development teams to focus their remediation efforts on the most critical issues first. The system may also provide estimated effort and timeline information for implementing each recommendation, facilitating project planning and resource allocation decisions.

The process 200 further includes comprehensive reporting and artifacts 216 functionality that provides stakeholders with detailed insights into quality trends, risk assessments, and actionable recommendations for improvement. The reporting and artifacts 216 component enables visualization of quality metrics across all development phases and generates detailed documentation of validation results. The intake phase 202 represents the foundation of the quality validation process, involving scanning intake requirements and validating estimates against historical project data to provide more accurate effort predictions. The intake phase 202 maintains a repository of past projects with detailed metadata about requirements complexity, technology stack, team composition, and actual effort expended. For example, when a new project requires implementing a payment processing feature, the intake phase 202 may analyze similar past projects to identify patterns in requirements complexity and resource allocation, enabling validation of current project estimates against proven benchmarks. If historical data indicates that similar payment features typically require 150-200 development hours, but the current estimate is only 80 hours, the intake phase 202 may flag this discrepancy and provide recommendations based on actual project outcomes. The intake phase 202 validation also includes completeness checks to ensure that requirements meet minimum threshold criteria, such as having clearly defined acceptance criteria, specified user personas, and identified integration points.

The UX design phase 204 implements comprehensive design validation through multiple scanning mechanisms. The UX design phase 204 includes scanning UX design according to requirements to ensure that design artifacts align with the functional specifications defined during the intake phase 202. Additionally, the UX design phase 204 performs scanning UX design according to design libraries such as Digital Design Libraries (DDL) that contain standardized UI components, color palettes, brand guidelines, and accessibility compliance standards. For instance, the UX design phase 204 may validate that a login form uses approved color schemes (such as specific hex codes for primary and secondary colors), incorporates standard button sizes and spacing, and includes required accessibility features like proper contrast ratios and keyboard navigation support. Moreover, the UX design phase 204 may validate design consistency across different user interface elements and ensure adherence to regulatory requirements such as Americans with Disabilities Act (ADA) guidelines, ensuring that all interactive elements meet minimum size requirements and that color combinations provide sufficient contrast for users with visual impairments. The UX design phase 204 may also verify that design patterns follow established enterprise standards, such as consistent navigation structures and standardized error message formats.

The architecture review phase 206 comprises scanning the architecture done as per requirement, scanning the artifacts, and scanning the design patterns to ensure technical specifications align with both functional requirements and established architectural standards. The user stories phase 208 includes scanning user stories according to rules and scanning the stories for intake coverage to verify complete requirements traceability. The code commit phase 210 involves scanning the code to verify if coded as per user story and architecture, scanning code for design patterns, and checking for functional correctness of code to ensure implementation fidelity. The testing phase 212 includes scanning the unit test cases, functional coverage as per user story, and performance testing coverage to validate comprehensive quality assurance before deployment.

In particular, the system may receive, for a software application, a plurality of functional specifications and a plurality of user requirement specifications. In some embodiments, the plurality of functional specifications comprises requirements for the software application, and the plurality of user requirement specifications comprises user stories that define specific outcomes. Functional specifications may represent high-level business objectives, technical requirements, and system capabilities that define what the software application should accomplish. For example, functional specifications may include performance requirements such as response time thresholds, scalability targets, security protocols, and integration requirements with existing systems. User requirement specifications may encompass detailed user stories written in formats such as Behavior-Driven Development (BDD) that specify particular user interactions, acceptance criteria, and expected system behaviors. In particular, user stories may follow standardized formats that include user personas, specific actions, and measurable outcomes to ensure clarity and testability. The system may process these specifications through natural language processing (NLP) techniques to extract semantic meaning and identify validation requirements. Thus, the combination of functional and user requirement specifications provides a comprehensive foundation for generating project-specific validation parameters that may assess software artifacts against both technical and user-centered criteria.

Figure 3:
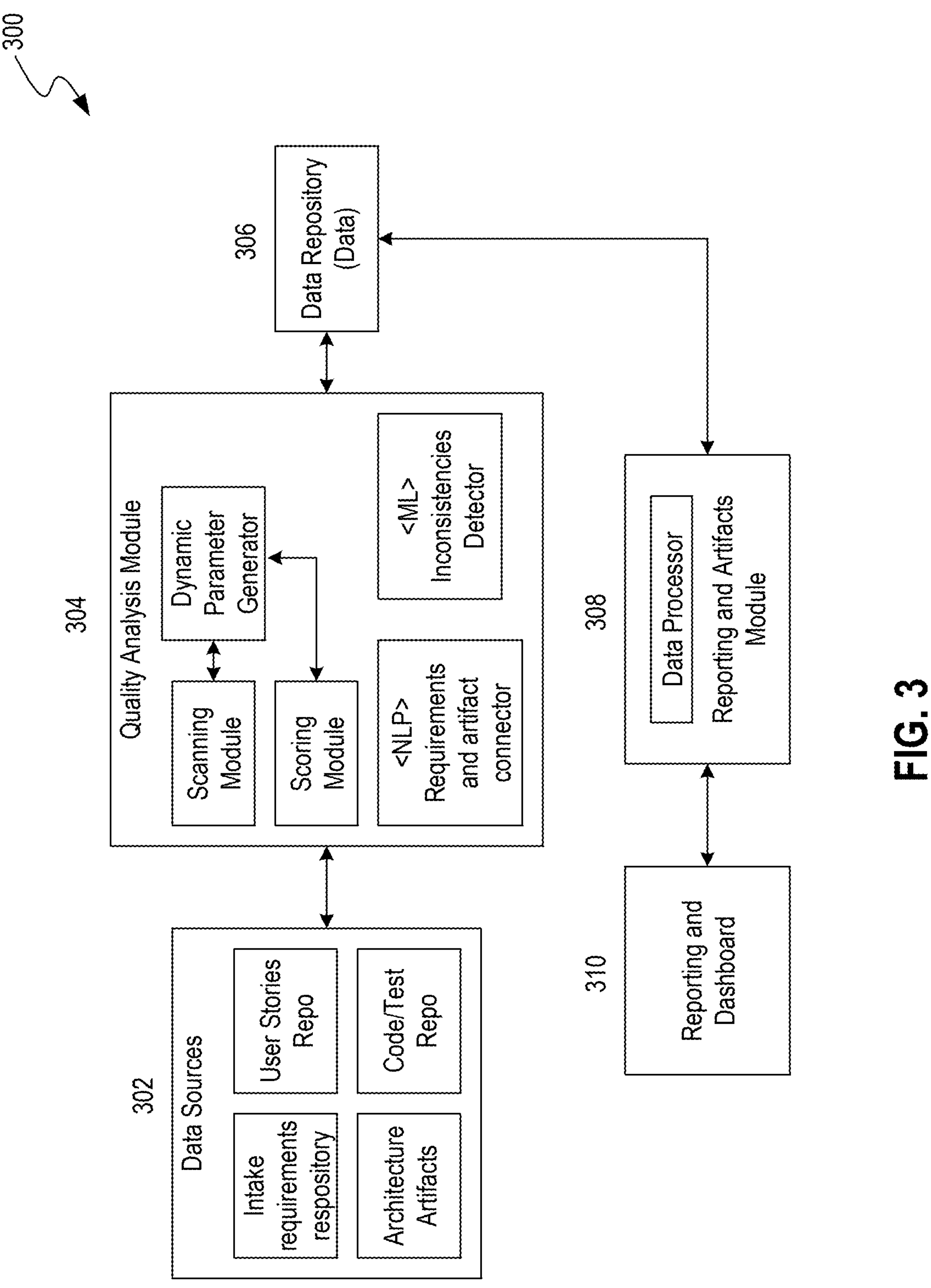
FIG. 3 illustrates a workflow for a software application review process, in accordance with some implementations of the present technology.

FIG. 3 illustrates a workflow 300 for a software application review process, in accordance with some embodiments of the present technology. The workflow 300 includes a data sources 302 component including an intake requirements repository, user stories repository, architecture artifacts, and code/test repository. The workflow 300 also includes a quality analysis module 304 containing a scanning module connected to dynamic parameter generator, a scoring module, an NLP requirements and artifact connector, and an ML inconsistencies detector. The workflow 300 further includes a data repository 306 connected to a data processor 308 within a reporting and artifacts module, which connects to a reporting and dashboard component 310. The workflow 300 shows interconnections between these components through bidirectional arrows, enabling data flow and validation across the software development lifecycle phases. The scanning module may apply parameters to analyze different types of software artifacts, while the scoring module may calculate quality metrics based on validation results. Moreover, the NLP requirements and artifact connector may process unstructured text documents, such as requirements specifications and user stories, to extract semantic content for validation purposes. The ML inconsistencies detector may identify discrepancies between artifacts from different development phases, such as detecting when code implementation does not align with architectural specifications or when user stories do not adequately cover intake requirements.

The system may generate, for a generative machine learning model, a prompt that causes the generative machine learning model to output dynamic parameters that enable error detection within a plurality of software elements generated during one or more phases of generation of the software application. The generative machine learning model may be a large language model (LLM) or transformer-based architecture capable of processing natural language inputs and generating structured outputs. For example, the model may be based on architectures such as GPT, BERT, or other transformer models that have been trained on software development documentation and validation patterns. The model may be any of the types of models discussed in relation to FIGS. 5 and 6.

The prompt may be carefully constructed through iterative refinement processes to include the functional specifications, user requirement specifications, and contextual information about the specific software project. In particular, the prompt may package relevant validation rules, project context, and artifact characteristics in a format that enables the generative model to produce accurate and relevant validation parameters. The dynamic parameters may represent application-specific validation rules that are tailored to the particular project's requirements rather than relying on static, predefined validation criteria. Thus, this approach enables the system to create customized validation frameworks that may adapt to different project types, technologies, and organizational standards.

The prompt may cause the model to output dynamic parameters that enable error detection within a plurality of software elements generated during one or more phases of generation of the software application. The dynamic parameters may comprise application-specific rules based on the plurality of functional specifications and the plurality of user requirement specifications. For example, if the functional specifications require compliance with specific security standards such as PII data handling protocols, the dynamic parameters may include validation rules that check for proper data encryption, access controls, and audit logging throughout the software artifacts. The application-specific rules may encompass various validation categories including functional correctness, design consistency, architectural compliance, and regulatory adherence. Moreover, these rules may be weighted according to their importance, with security-related violations receiving higher priority than stylistic inconsistencies. The system may generate different types of validation rules for different phases of development, such as requirements completeness rules for the intake phase, design library compliance rules for the UX phase, and functional implementation rules for the coding phase. In particular, the dynamic nature of these parameters enables the system to adapt validation criteria based on project characteristics, technology stack, and organizational policies without requiring manual rule configuration for each new project.

The dynamic parameters may be used to detect errors within the plurality of software elements. Software elements may include diverse artifact types such as requirements documents, design specifications, architecture diagrams, user stories, source code, test cases, and deployment configurations. For example, the system may apply dynamic parameters to validate that user stories adequately cover all intake requirements, that architectural designs align with functional specifications, and that code implementations correctly realize the intended business logic. Error detection may involve both syntactic validation (checking for proper formatting and structure) and semantic validation (verifying functional correctness and requirement alignment). Moreover, the system may perform cross-phase validation to identify inconsistencies between artifacts from different development stages. In particular, the dynamic parameters enable functional validation that goes beyond traditional static analysis tools by assessing whether software elements actually implement the intended functionality rather than merely checking for coding standards compliance. Thus, this comprehensive error detection capability addresses the technical challenge of ensuring quality and consistency across the entire software development lifecycle.

The system may input the prompt into the generative machine learning model to cause the generative machine learning model to output a set of dynamic parameters. This process may involve API calls to cloud-based language models or local execution of generative models that have been specifically trained or fine-tuned for software development validation tasks. For example, the system may use models that have been trained on large corpora of software documentation, requirements specifications, and validation patterns to ensure accurate parameter generation. The output set of dynamic parameters may be structured as a collection of validation rules, each with specific criteria, thresholds, and weighting factors. Moreover, the system may implement validation mechanisms to ensure that the generated parameters are appropriate and complete for the specific project context. In particular, the system may apply consistency checks to verify that the generated parameters align with organizational policies and industry standards. The dynamic parameter generation process may be iterative, with the system refining prompts based on validation results and feedback to improve the accuracy and relevance of generated parameters. Thus, this approach enables automated creation of project-specific validation frameworks that may adapt to diverse software development contexts.

Returning to FIG. 3, the workflow 300 demonstrates how the quality analysis module 304 processes software artifacts through its various components. The scanning module may apply the generated dynamic parameters to analyze artifacts from the data sources 302, while the scoring module may calculate quality metrics based on validation results. The NLP requirements and artifact connector may facilitate semantic analysis of unstructured documents, enabling the system to understand the meaning and intent behind requirements and specifications. Moreover, the ML inconsistencies detector may identify discrepancies between artifacts from different phases, such as detecting when architectural decisions do not support the original requirements or when code implementations deviate from design specifications.

The system may generate, using the set of dynamic parameters, a plurality of quality metrics for the plurality of software elements. In some embodiments, each quality metric may indicate a conformity of a software element to a functional specification of the plurality of functional specifications or a user requirement specification of the plurality of user requirement specifications. Quality metrics may be quantitative measures that represent the degree to which software artifacts meet their intended requirements and standards. For example, a quality metric for a user story may indicate what percentage of validation rules were satisfied, such as 85% compliance, indicating that 17 out of 20 applicable rules were met. The system may calculate different types of quality metrics including completeness scores (measuring how thoroughly requirements are addressed), consistency scores (measuring alignment between different artifacts), and compliance scores (measuring adherence to standards and policies). Moreover, quality metrics may be aggregated across different levels, from individual artifact scores to phase-level scores to overall project scores. In particular, the system may apply weighting factors to different validation rules based on their importance, ensuring that critical issues such as security violations have greater impact on quality scores than minor formatting inconsistencies. Thus, these quantitative quality metrics provide objective measures for assessing software development progress and identifying areas requiring attention.

In some embodiments, generating the plurality of quality metrics for the plurality of software elements may involve several steps. The system may generate, for the generative machine learning model, a subsequent prompt that causes the generative machine learning model to analyze the conformity of features of each software element in relation to a respective functional specification or a respective user requirement specification. For example, the subsequent prompt may include the specific software artifact, the relevant requirements, and the dynamic validation parameters to enable comprehensive analysis. The system may input, into the generative machine learning model, the prompt, each software element, and the set of dynamic parameters. Moreover, the system may receive, from the generative machine learning model, the plurality of quality metrics for the plurality of software elements. In particular, each quality metric may indicate the conformity of the software element in relation to the respective functional specification or the respective user requirement specification. This multistep process enables detailed analysis of individual artifacts while maintaining consistency in validation approaches across different software elements. Thus, the system may leverage the generative model's natural language processing capabilities to perform sophisticated semantic analysis of software artifacts and their alignment with requirements.

The system may automatically analyze the quality of each phase of the software development lifecycle, performing functional validation and generating comprehensive scores including a production change risk score. Unlike conventional quality assurance approaches that rely on isolated, manual reviews of individual development stages, the disclosed system provides automated, quantitative assessment of quality at each phase—from intake requirements through testing—and aggregates these assessments into an overall production change risk score. This production change risk score represents a weighted combination of quality metrics from all phases, providing stakeholders with a single, actionable indicator of deployment readiness. For example, if the intake phase scores 85%, design phase scores 92%, architecture review phase scores 78%, user stories phase scores 88%, code commit phase scores 90%, and testing phase scores 95%, the system calculates a weighted production change risk score that considers the criticality of each phase and identifies specific areas requiring attention before production deployment. By automatically generating these scores, the system enables data-driven deployment decisions and prevents inadequately validated software from reaching production environments.

The system may detect an error within a particular software element of the plurality of software elements based on the plurality of quality metrics indicating that the particular software element fails to conform to a corresponding user requirement specification. Error detection may involve comparing quality metric values against predefined thresholds or identifying specific validation rule failures. For example, if a user story receives a completeness score below 80% or fails critical validation rules such as missing acceptance criteria, the system may classify this as an error requiring remediation. The system may implement different error severity levels, with critical errors (such as security violations) requiring immediate attention and minor errors (such as formatting issues) being flagged for future correction. Moreover, the system may perform contextual analysis to distinguish between genuine errors and acceptable variations based on project-specific requirements. In particular, error detection may involve cross-referencing multiple quality metrics to identify patterns that indicate systematic issues rather than isolated problems. The system may also maintain historical data about error patterns to improve detection accuracy and reduce false positives. Thus, this comprehensive error detection capability enables proactive identification of quality issues before they propagate to later development phases or production environments.

In response to detecting the error within the particular software element, the system may generate one or more modifications designed to remediate the error within the particular software element. In some embodiments, the system may generate the modifications by prompting the generative machine learning model using the set of dynamic parameters and the particular software element. The modifications may include specific suggestions for correcting identified issues, such as adding missing acceptance criteria to user stories, updating architectural diagrams to reflect requirement changes, or modifying code implementations to align with functional specifications. For example, if a user story lacks proper BDD formatting, the system may generate a suggested rewrite that follows the "Given-When-Then" structure with appropriate acceptance criteria. The generative model may analyze the context of the error, the surrounding artifacts, and the project requirements to produce targeted recommendations that address the root cause rather than merely treating symptoms. Moreover, the system may provide multiple alternative modifications to give developers flexibility in choosing the most appropriate solution for their specific context. In particular, the modifications may include explanatory text that helps developers understand why the changes are necessary and how they improve overall quality. Thus, this automated modification generation capability significantly reduces the manual effort required to address quality issues while ensuring that corrections align with project standards and requirements.

The system may automatically implement the one or more modifications to the particular software element. Automatic implementation may involve direct integration with development tools and platforms such as JIRA for user story management, version control systems for code modifications, or design tools for UX artifact updates. For example, the system may be implemented as plugins or extensions that may directly modify artifacts within their native environments, such as updating JIRA tickets with improved user story descriptions or committing code changes to repositories. The system may implement safeguards to ensure that automatic modifications do not introduce new issues or conflicts with existing work. Moreover, the system may provide approval workflows that allow human reviewers to validate proposed changes before implementation, particularly for critical modifications that may impact system functionality. In particular, automatic implementation may include rollback capabilities that enable reverting changes if they prove problematic during subsequent validation or testing. The system may also maintain audit trails of all automatic modifications to support compliance requirements and enable forensic analysis of quality improvement processes. Thus, this automatic implementation capability streamlines the quality improvement process while maintaining appropriate controls and oversight mechanisms.

In some embodiments, the system may detect, using a machine learning model separate from the generative machine learning model, an inconsistency between the particular software element and a second software element. For example, the particular software element and the second software element may be generated during different phases of the one or more phases, and the particular software element may be generated before the second software element. The separate machine learning model may be specifically trained for cross-phase consistency analysis, using techniques such as semantic similarity analysis, dependency tracking, or change impact assessment. For instance, the system may detect that architectural specifications created during the design phase do not support the functional requirements defined during the intake phase or that code implementations do not correctly realize the business logic described in user stories. The system may generate, in response to detecting the inconsistency, a modification to the second software element to resolve the inconsistency with the particular software element. Moreover, this cross-phase validation capability addresses the technical challenge of maintaining consistency across the entire software development lifecycle. In particular, the system may prioritize earlier-phase artifacts when resolving inconsistencies, based on the principle that requirements and design decisions should drive implementation rather than the reverse. Returning to FIG. 3, the ML inconsistencies detector component within the quality analysis module 304 may perform this cross-phase analysis by comparing artifacts from different repositories and identifying semantic or functional misalignments that require resolution.

The system automatically analyzes overall quality trends of artifacts-including code, design, architecture artifacts, test cases, and requirements—to identify early risks before they propagate through subsequent development phases. This trend analysis capability addresses a significant technical challenge in conventional software development processes, where quality issues often remain undetected until late stages when remediation costs are substantially higher. The system maintains historical quality data across multiple projects and development phases, enabling identification of patterns that indicate systematic issues. For example, if multiple architecture reviews consistently fail validation rules related to scalability requirements, the system may identify that intake phase rules need enhancement to capture more detailed scalability specifications earlier in the process. Similarly, if user stories consistently score below threshold values for completeness, the system may flag this trend and recommend process improvements or additional training for requirements authors. By analyzing quality trends across diverse artifact types, the system provides early warning indicators that enable proactive intervention, reducing the likelihood of defects reaching production and improving overall software development efficiency.

The system may generate, based on the plurality of quality metrics, a production confidence metric that indicates a confidence level for deploying the software application to a production environment. The production confidence metric may be calculated by aggregating quality scores across all development phases, applying weighting factors based on the criticality of different components, and considering historical data about the relationship between quality metrics and production success rates. For example, the system may determine that applications with overall quality scores above 90% and no critical security violations have a 95% probability of successful production deployment without major issues. The system may also consider factors such as test coverage, code complexity, and requirement traceability when calculating confidence levels. Moreover, the production confidence metric may be updated dynamically as new artifacts are created or existing ones are modified throughout the development process. Based on determining that the production confidence metric falls below a predetermined threshold, the system may prevent deployment of the software application. In particular, this deployment gate capability ensures that only applications meeting minimum quality standards are released to production environments, reducing the likelihood of production incidents and customer impact. Thus, the production confidence metric provides objective, data-driven decision support for deployment readiness assessments.

The system may automatically generate, using the generative machine learning model and the set of dynamic parameters, a subsequent set of dynamic parameters for subsequent software applications having similar characteristics to the software application. This capability enables the system to learn from previous projects and apply validated parameter sets to new projects with similar requirements, technology stacks, or organizational contexts. For example, if the system successfully validates a mobile banking application using specific dynamic parameters, it may automatically generate similar parameters for other financial services applications that share common security requirements, user interface patterns, or regulatory compliance needs. The system may identify project similarities through various techniques including requirement analysis, technology stack comparison, and organizational policy matching. Moreover, the system may maintain a repository of successful parameter sets indexed by project characteristics to enable efficient reuse and adaptation. In particular, this parameter reuse capability reduces the setup time for new projects while ensuring that validation approaches are based on proven successful patterns. The system may also implement feedback mechanisms that refine parameter generation based on the success rates of previous applications, creating a continuous improvement cycle that enhances validation effectiveness over time. Thus, this learning capability transforms the system from a project-specific tool into an organizational knowledge asset that accumulates and applies quality assurance expertise across multiple software development initiatives.

In some embodiments, the system may receive feedback data from deployment of a previously completed software application. The feedback data may include production performance metrics, user satisfaction scores, defect reports, security incident data, and operational efficiency measures that indicate how well the deployed application meets its intended objectives. For example, the system may collect data about application response times, error rates, user adoption metrics, and maintenance costs to assess the real-world success of the software. The system may analyze the feedback data to identify patterns between the plurality of quality metrics and production performance following the deployment. This analysis may reveal correlations such as applications with higher user story completeness scores experiencing fewer user interface issues in production or projects with better architectural compliance scores requiring less maintenance effort. Moreover, the system may use statistical analysis and machine learning techniques to identify which quality metrics are most predictive of production success. The system may generate an updated set of dynamic validation parameters based on the patterns identified in the feedback analysis. In particular, this may involve adjusting validation rule weights, adding new validation criteria, or modifying threshold values to better predict production outcomes. The system may apply the updated set of dynamic validation parameters to validate subsequent software elements in a subsequent software application, creating a continuous improvement cycle that enhances the predictive accuracy of quality assessments. Thus, this feedback-driven improvement capability ensures that the validation system evolves based on real-world outcomes rather than theoretical assumptions, leading to increasingly effective quality assurance processes that better predict and prevent production issues.

Figure 7:
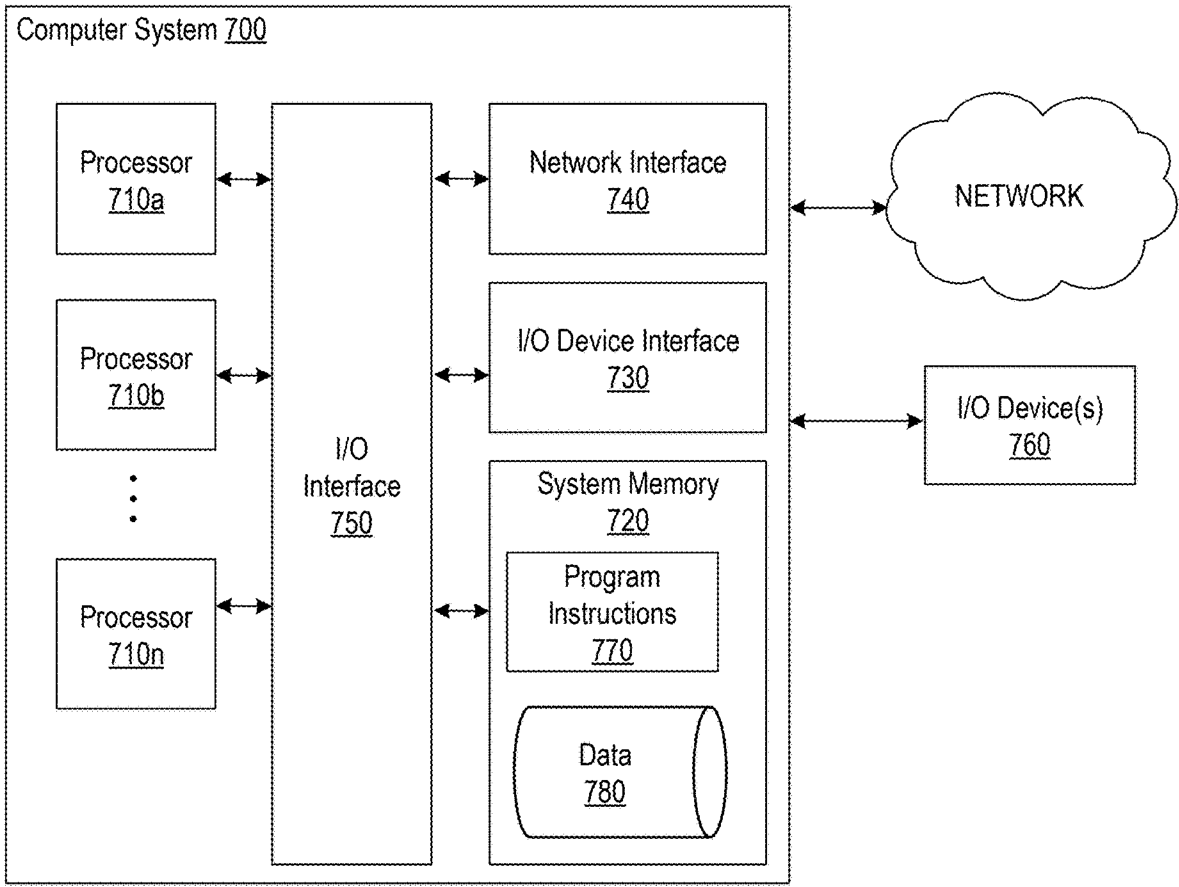
FIG. 7 illustrates an example computing system that may be used in accordance with some implementations of this disclosure.

FIG. 4 illustrates a flowchart of a process 400 for error detection and remediation in software applications, in accordance with some implementations of the present technology. The operations of FIG. 4 may use components described in relation to FIGS. 1-3. In some embodiments, the quality analysis system 160 may include one or more components of computer system 700, as shown in FIG. 7.

At step 402, the quality analysis system 160 (e.g., using one or more of processors 710*a*-710*n*) may receive functional specifications and user requirement specifications for a software application. For example, the functional specifications may include high-level business requirements and technical specifications, while the user requirement specifications may include detailed user stories and acceptance criteria that define specific behaviors and outcomes for the software application. The system may receive these diverse specification types through various interface mechanisms including project management systems, requirements repositories, or development platforms, treating them as unified validation inputs rather than separate specification paradigms.

At step 404, the quality analysis system 160 (e.g., using one or more of processors 710*a*-710*n*) may generate, for a generative machine learning model, a prompt that causes the generative machine learning model to output dynamic parameters that enable error detection within software elements generated during development phases. For example, the system may convert the functional and user requirement specifications into application-specific validation rules that may be applied to diverse software artifacts including code, design documents, architecture diagrams, and test cases. The dynamic parameter generation process may serve as a bridge between human-readable requirements and computational validation criteria, with the system using large language models that analyze semantic content and identify discrete validation components within the project specifications.

At step 406, the quality analysis system 160 (e.g., using one or more of processors 710*a*-710*n*) may input the prompt into the generative machine learning model to cause the generative machine learning model to output a set of dynamic parameters. For example, the system may execute the generative model using the crafted prompt from step 404, resulting in customized validation parameters tailored to the specific software application requirements. The generative machine learning model may process the prompt and produce dynamic parameters that encode project-specific validation rules and quality assessment criteria through API calls to large language models or through local execution of generative models that have been trained on software development validation tasks.

At step 408, the quality analysis system 160 (e.g., using one or more of processors 710*a*-710*n*) may generate quality metrics for software elements using the set of dynamic parameters obtained from step 406. For example, the system may identify validation pathways that represent distinct quality assessment approaches, such as separating "code compliance with functional requirements" from "design alignment with user stories" within a single software application validation request. The quality metric generation process may involve analyzing the software element characteristics to identify conformity levels based on the dynamic validation parameters and project-specific requirements using multi-method quality assessment strategies including semantic analysis, pattern-based recognition, and conformity threshold analysis.

At step 410, the quality analysis system 160 (e.g., using one or more of processors 710*a*-710*n*) may detect errors within software elements based on quality metrics indicating that a particular software element fails to conform to a corresponding functional specification or user requirement specification. For example, the system may create error detection assignments that balance functional validation capabilities with requirements traceability across all software elements, enabling identification of quality issues beyond simple syntactic checking. These error detection assignments may encode both individual element characteristics and system-wide quality objectives, allowing the system to achieve comprehensive validation even when software elements have different validation requirements using classification algorithms trained on software quality data in a multi-dimensional space where quality issues are positioned to maximize both accuracy and completeness. In response to detecting the error within the particular software element, the quality analysis system 160 may generate one or more recommendations for modifications designed to remediate the error within the particular software element At step 412, the quality analysis system 160 (e.g., using one or more of processors 710*a*-710*n*) may automatically implement one or more modifications to the particular software element. For example, the system may analyze error characteristics and system conditions to determine whether each error corresponds to functional implementation issues or requirements alignment problems. Code-focused modifications may include syntax corrections, logic improvements, or architectural adjustments, while design-focused modifications may include layout changes, user experience enhancements, or specification alignment updates. The system may implement various remediation mechanisms including automated code generation or requirements-based modification suggestions, with implementation commands directed to specialized modification systems that perform layered artifact updates with consistency verification to ensure that each software element modification maintains functional precision and requirements alignment across the final software application.

Although the present invention has been described in detail for the purpose of illustration based on what is currently considered to be the most practical and preferred implementations, it is to be understood that such detail is solely for that purpose and that the invention is not limited to the disclosed implementations but, on the contrary, is intended to cover modifications and equivalent arrangements that are within the scope of the appended claims. For example, it is to be understood that the present invention contemplates that, to the extent possible, one or more features of any implementation may be combined with one or more features of any other implementation.

The above-described implementations of the present disclosure are presented for purposes of illustration, not of limitation, and the present disclosure is limited only by the claims that follow. Furthermore, it should be noted that the features and limitations described in any one implementation may be applied to any other implementation herein, and flowcharts or examples relating to one implementation may be combined with any other implementation in a suitable manner, done in different orders, or done in parallel. In addition, the systems and methods described herein may be performed in real time. It should also be noted that the systems or methods described above may be applied to, or used in accordance with, other systems or methods.

Exemplary Machine Learning Model

Figure 5:
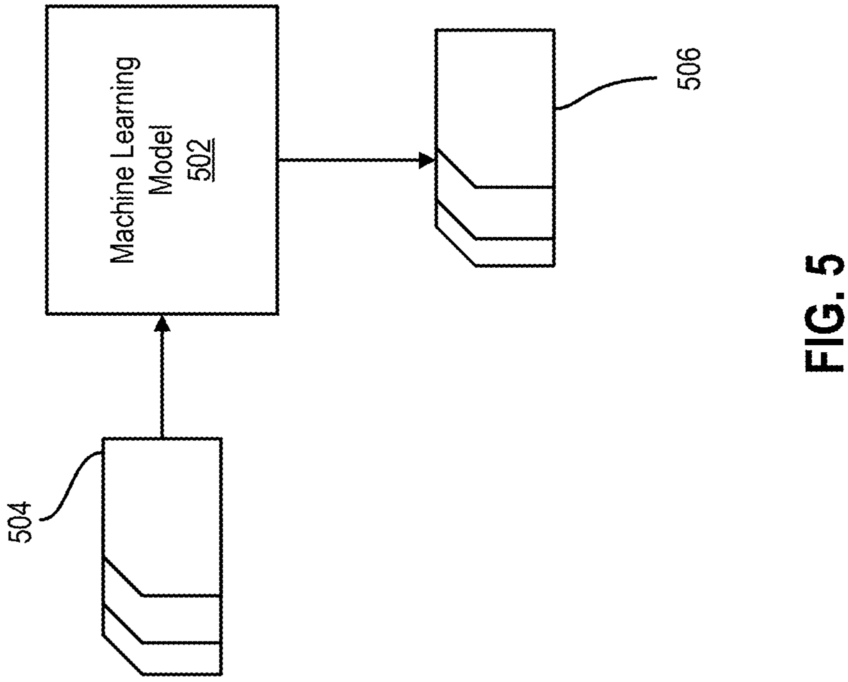
FIG. 5 illustrates an exemplary machine learning model, in accordance with one or more implementations of this disclosure.

FIG. 5 illustrates an exemplary machine learning model 502, in accordance with one or more implementations of this disclosure. The machine learning model 502 may be an artificial intelligence (AI) model, such as a generative model, or another model. According to some examples, the machine learning model may be any model, such as a model for software development quality analysis and error detection. In some embodiments, the machine learning model 502 may be trained to intake input 504, including functional specifications and user requirement specifications received. As a result of inputting the input 504 into the machine learning model 502, the machine learning model 502 may then output an output 506. As described herein, the input data may include data such as software requirements, artifact specifications, or validation parameters. In particular, the machine learning model 502 may receive software development specifications and processing tasks for quality analysis and error detection optimization.

For example, the output 506 may include dynamic validation parameters and quality metrics based on the software specifications and error detection optimization. Furthermore, as described, the machine learning model 502 may be configured to output detailed quality scores and explanations regarding the validation strategies. The machine learning model 502 may be trained on a training dataset containing a plurality of software development examples and quality outcomes, such as verified validation results and error detection effectiveness that were identified by operators. For example, the machine learning model 502 is described in relation to FIG. 5 herein.

The output parameters may be fed back to the machine learning model 502 as input to train the machine learning model 502 (e.g., alone or in conjunction with user indications of the accuracy of outputs, labels associated with the inputs, or other reference feedback information). The machine learning model 502 may update its configurations (e.g., weights, biases, or other parameters) based on the assessment of its prediction and reference feedback information (e.g., user indication of accuracy, reference labels, or other information). Connection weights may be adjusted, for example, if the machine learning model 502 is a neural network to reconcile differences between the neural network's prediction and the reference feedback regarding software quality effectiveness (e.g., accuracy versus completeness optimization strategies for functional versus non-functional validation).

One or more neurons of the neural network may require that their respective errors be sent backward through the neural network to facilitate the update process (e.g., back-propagation of error). Updates to the connection weights can, for example, be reflective of the magnitude of error propagated backward after a forward pass has been completed. In this way, for example, the machine learning model may be trained to generate better predictions.

In some embodiments, the machine learning model 502 may include an artificial neural network. In such implementations, the machine learning model 502 may include an input layer and one or more hidden layers. Each neural unit of the machine learning model 502 may be connected to one or more other neural units of the machine learning model 502. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model 502 may be self-learning or trained, rather than explicitly programmed, and may perform significantly better in certain areas of problem-solving as compared to computer programs that do not use machine learning. During training, an output layer of the machine learning model 502 may correspond to a quality validation strategy or error classification of the machine learning model 502, and an input known to correspond to that validation strategy or classification may be input into an input layer of the machine learning model 502 during training. During testing, an input without a known validation strategy or classification may be input into the input layer, and a determined strategy or classification may be output.

The machine learning model 502 may include embedding layers in which each feature of a vector is converted into a dense vector representation. These dense vector representations for each feature may be pooled at one or more subsequent layers to convert the set of embedding vectors into a single vector. The machine learning model 502 may be structured as a factorization machine model. The machine learning model 502 may be a nonlinear model or supervised learning model that may perform validation parameter generation or error classification. For example, the machine learning model 502 may be a general-purpose supervised learning algorithm that the software quality analysis system uses for both dynamic parameter optimization and error detection. Alternatively, the machine learning model 502 may include a Bayesian model configured to perform variational inference on the graph or vector.

Transformer for Neural Network

To assist in understanding the present disclosure, some concepts relevant to neural networks and machine learning are discussed herein. Generally, a neural network includes a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer"), and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks, and there may be more complex neural network designs that include feedback connections, skip connections, or other such possible connections between neurons or layers, which are not discussed in detail here.

A deep neural network (DNN) is a type of neural network that has multiple layers or a large number of neurons. The term "DNN" may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and auto-regressive models, among others.

DNNs are often used as machine learning-based models for modeling complex behaviors (e.g., human language, image recognition, object classification, etc.) in order to improve the accuracy of outputs (e.g., more accurate predictions) as compared, for example, with models with fewer layers. In the present disclosure, the term "machine learning-based model" or, more simply, "machine learning model" may be understood to refer to a DNN. Training a machine learning model refers to a process of learning the values of the parameters (or weights) of the neurons in the layers such that the machine learning model is able to model the target behavior to a desired degree of accuracy. Training typically requires the use of a training dataset, which is a set of data that is relevant to the target behavior of the machine learning model.

As an example, to train a machine learning model that is intended to model human language (also referred to as a "language model"), the training dataset may be a collection of text documents, referred to as a "text corpus" (or simply referred to as a "corpus"). The corpus may represent a language domain (e.g., a single language) or a subject domain (e.g., scientific papers) or may encompass another domain or domains, be they larger or smaller than a single language or subject domain. For example, a relatively large, multilingual, and non-subject-specific corpus may be created by extracting text from online web pages or publicly available social media posts. Training data may be annotated with ground truth labels (e.g., each data entry in the training dataset may be paired with a label) or may be unlabeled.

Training a machine learning model generally involves inputting into a machine learning model (e.g., an untrained machine learning model) training data to be processed by the machine learning model, processing the training data using the machine learning model, collecting the output generated by the machine learning model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding machine learning model input (e.g., in the case of an autoencoder) or may be a measure of some target observable effect on the environment (e.g., in the case of a reinforcement learning agent). The parameters of the machine learning model are updated based on a difference between the generated output value and the desired target value. For example, if the value outputted by the machine learning model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the machine learning model is typically to minimize a loss function or maximize a reward function.

The training data may be a subset of a larger dataset. For example, a dataset may be split into three mutually exclusive subsets: a training set, a validation (or cross-validation) set, and a testing set. The three subsets of data may be used sequentially during machine learning model training. For example, the training set may be first used to train one or more machine learning models, e.g., each machine learning model having a particular architecture, having a particular training procedure, being describable by a set of model hyperparameters, or otherwise being varied from the other of the one or more machine learning models. The validation (or cross-validation) set may then be used as input data into the trained machine learning models to, e.g., measure the performance of the trained machine learning models or compare performance between them. Where hyperparameters are used, a new set of hyperparameters may be determined based on the measured performance of one or more of the trained machine learning models, and the first step of training (e.g., with the training set) may begin again on a different machine learning model described by the new set of determined hyperparameters. In this way, these steps may be repeated to produce a more performant trained machine learning model. Once such a trained machine learning model is obtained (e.g., after the hyperparameters have been adjusted to achieve a desired level of performance), a third step of collecting the output generated by the trained machine learning model applied to the third subset (the testing set) may begin. The output generated from the testing set may be compared with the corresponding desired target values to give a final assessment of the trained machine learning model's accuracy. Other segmentations of the larger dataset or schemes for using the segments for training one or more machine learning models are possible.

Backpropagation is an algorithm for training a machine learning model. Backpropagation is used to adjust (e.g., update) the value of the parameters in the machine learning model with the goal of optimizing the objective function. For example, a defined loss function is calculated by forward propagation of an input to obtain an output of the machine learning model and a comparison of the output value with the target value. Backpropagation calculates a gradient of the loss function with respect to the parameters of the machine learning model, and a gradient algorithm (e.g., gradient descent) is used to update (e.g., "learn") the parameters to reduce the loss function. Backpropagation is performed iteratively so that the loss function is converged or minimized. Other techniques for learning the parameters of the machine learning model may be used. The process of updating (or learning) the parameters over many iterations is referred to as training. Training may be carried out iteratively until a convergence condition is met (e.g., a predefined maximum number of iterations has been performed, or the value outputted by the machine learning model is sufficiently converged with the desired target value), after which the machine learning model is considered to be sufficiently trained. The values of the learned parameters may then be fixed, and the machine learning model may be deployed to generate output in real-world applications (also referred to as "inference").

In some examples, a trained machine learning model may be fine-tuned, meaning that the values of the learned parameters may be adjusted slightly in order for the machine learning model to better model a specific task. Fine-tuning of a machine learning model typically involves further training the machine learning model on a number of data samples (which may be smaller in number/cardinality than those used to train the model initially) that closely target the specific task. For example, a machine learning model for generating natural language, e.g., for responses to user queries, or validation decisions that have been trained generically on publicly available text corpora may be, e.g., fine-tuned by further training using specific training samples. The specific training samples may be used to generate language in a certain style or in a certain format. For example, the machine learning model may be trained to generate a response having a particular style and structure with a given topic.

Some concepts in machine learning-based language models are now discussed. It may be noted that while the term "language model" has been commonly used to refer to a machine learning-based language model, there may exist non-machine learning language models. In the present disclosure, the term "language model" may refer to a machine learning-based language model (e.g., a language model that is implemented using a neural network or other machine learning architecture) unless stated otherwise. For example, unless stated otherwise, the "language model" encompasses large language models (LLMs).

A language model may use a neural network (typically a DNN) to perform natural language processing (NLP) tasks. A language model may be trained to model how words relate to each other in a textual sequence based on probabilities. A language model may contain hundreds of thousands of learned parameters or, in the case of an LLM, may contain millions or billions of learned parameters or more. As non-limiting examples, a language model may generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models may also be used for chatbots (e.g., virtual assistance).

A type of neural network architecture, referred to as a "transformer," may be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any machine learning-based language model, including language models based on other neural network architectures, such as RNN-based language models.

Figure 6:
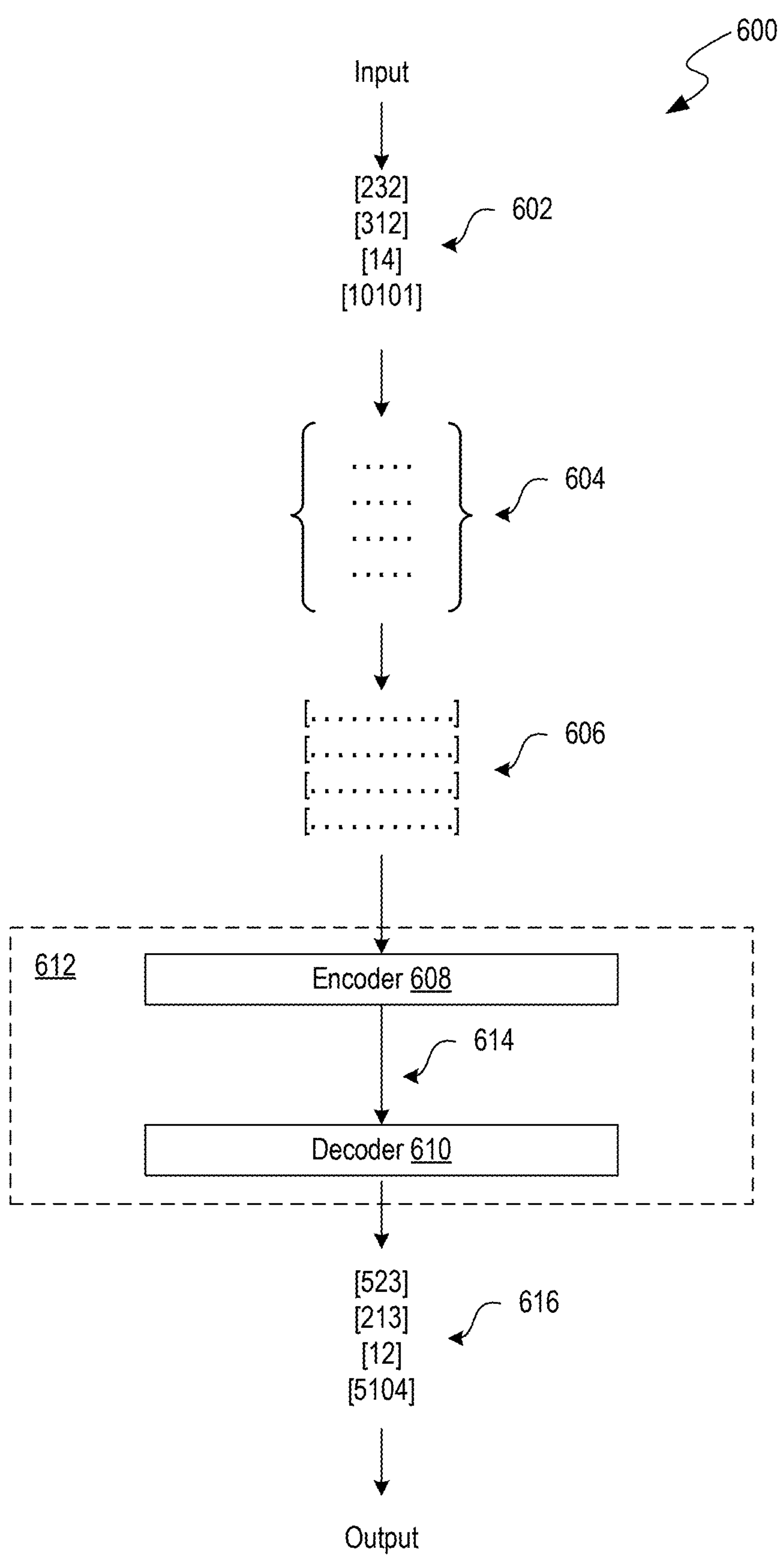
FIG. 6 is a block diagram of an example transformer, in accordance with one or more implementations of this disclosure.

FIG. 6 is a block diagram 600 of an example transformer, in accordance with one or more implementations of this disclosure. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any machine learning-based language model, including language models based on other neural network architectures, such as RNN-based language models.

The transformer 612 includes an encoder 608 (which may include one or more encoder layers/blocks connected in series) and a decoder 610 (which may include one or more decoder layers/blocks connected in series). Generally, the encoder 608 and the decoder 610 each include multiple neural network layers, at least one of which may be a self-attention layer. The parameters of the neural network layers may be referred to as the parameters of the language model.

The transformer 612 may be trained to perform certain functions on a natural language input. Examples of the functions include summarizing existing content, brainstorming ideas, writing a rough draft, fixing spelling and grammar, and translating content. Summarizing may include extracting key points or themes from existing content in a high-level summary. Brainstorming ideas may include generating a list of ideas based on provided input. For example, the machine learning model may generate a list of names for a startup or costumes for an upcoming party. Writing a rough draft may include generating writing in a particular style that may be useful as a starting point for the user's writing. The style may be identified as, e.g., an email, a blog post, a social media post, or a poem. Fixing spelling and grammar may include correcting errors in an existing input text. Translating may include converting an existing input text into a variety of different languages. In some embodiments, the transformer 612 is trained to perform certain functions on input formats other than natural language input. For example, the input may include objects, images, audio content, video content, or a combination thereof.

The transformer 612 may be trained on a text corpus that is labeled (e.g., annotated to indicate verbs, nouns) or unlabeled. LLMs may be trained on a large unlabeled corpus. The term "language model," as used herein, may include a machine learning-based language model (e.g., a language model that is implemented using a neural network or other machine learning architecture) unless stated otherwise. Some LLMs may be trained on a large multi-language, multi-domain corpus to enable the model to be versatile at a variety of language-based tasks, such as generative tasks (e.g., generating human-like natural language responses to natural language input).

FIG. 6 illustrates how the transformer 612 may process textual input data. Input to a language model (whether transformer-based or otherwise) typically is in the form of natural language that may be parsed into tokens. The term "token" in the context of language models and NLP has a different meaning from the use of the same term in other contexts, such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without white space appended. In some embodiments, a token may correspond to a portion of a word.

For example, the word "greater" may be represented by a token for [great] and a second token for [er]. In another example, the text sequence "write a summary" may be parsed into the segments [write], [a], and [summary], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a list or a paragraph), an [EOT] token may be another special token that indicates the end of the textual sequence, other tokens may provide formatting information, etc.

As shown in the block diagram 600, a short sequence of tokens 602 corresponding to the input text is illustrated as input to the transformer 612. Tokenization of the text sequence into the tokens 602 may be performed by some pre-processing tokenization module, such as, for example, a byte-pair encoding tokenizer (the "pre" referring to the tokenization occurring prior to the processing of the tokenized input by the LLM), which is not shown in FIG. 6 for brevity. In general, the token sequence that is inputted to the transformer 612 may be of any length up to a maximum length defined based on the dimensions of the transformer 612. Each token 602 in the token sequence is converted into an embedding 606 (also referred to as an "embedding vector").

An embedding 606 is a learned numerical representation (such as, for example, a vector) of a token that captures some semantic meaning of the text segment represented by the token 602. The embedding 606 represents the text segment corresponding to the token 602 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 606 corresponding to the "write" token will be closer to another embedding corresponding to the "jot down" token in the vector space as compared to the distance between the embedding 606 corresponding to the "write" token and another embedding corresponding to the "summary" token.

The vector space may be defined by the dimensions and values of the embedding vectors. Various techniques may be used to convert a token 602 to an embedding 606. For example, another trained machine learning model may be used to convert the token 602 into an embedding 606. In particular, another trained machine learning model may be used to convert the token 602 into an embedding 606 in a way that encodes additional information into the embedding 606 (e.g., a trained machine learning model may encode positional information about the position of the token 602 in the text sequence into the embedding 606). In some embodiments, the numerical value of the token 602 may be used to look up the corresponding embedding in an embedding matrix 604, which may be learned during training of the transformer 612.

The generated embeddings, e.g., such as the embedding 606, are input into the encoder 608. The encoder 608 serves to encode the embedding 606 into feature vectors 614 that represent the latent features of the embedding 606. The encoder 608 may encode positional information (i.e., information about the sequence of the input) in the feature vectors 614. The feature vectors 614 may have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as the feature vectors 614, that may be generated by the encoder 608 may be referred to as a latent space or feature space.

Conceptually, the decoder 610 is designed to map the features represented by the feature vectors 614 into meaningful output, which may depend on the task that was assigned to the transformer 612. For example, if the transformer 612 is used for a translation task, the decoder 610 may map the feature vectors 614 into text output in a target language different from the language of the original tokens 602. Generally, in a generative language model, the decoder 610 serves to decode the feature vectors 614 into a sequence of tokens. The decoder 610 may generate output tokens 616 one by one. Each output token 616 may be fed back as input to the decoder 610 in order to generate the next output token 616. By feeding back the generated output and applying self-attention, the decoder 610 may generate a sequence of output tokens 616 that has sequential meaning (e.g., the resulting output text sequence is understandable as a sentence and obeys grammatical rules). The decoder 610 may generate output tokens 616 until a special [EOT] token (indicating the end of the text) is generated. The resulting sequence of output tokens 616 may then be converted to a text sequence in post-processing. For example, each output token 616 may be an integer number that corresponds to a vocabulary index. By looking up the text segment using the vocabulary index, the text segment corresponding to each output token 616 may be retrieved, the text segments may be concatenated together, and the final output text sequence may be obtained.

In some embodiments, the input provided to the transformer 612 includes instructions to perform a function on an existing text. The output may include, for example, a modified version of the input text and instructions to modify the text. The modification may include summarizing, translating, correcting grammar or spelling, changing the style of the input text, lengthening or shortening the text, or changing the format of the text (e.g., adding bullet points or checkboxes). As an example, the input text may include meeting notes prepared by a user, and the output may include a high-level summary of the meeting notes. In other examples, the input provided to the transformer includes a question or a request to generate text. The output may include a response to the question, text associated with the request, or a list of ideas associated with the request. For example, the input may include the question, "What is the weather like in San Francisco?" and the output may include a description of the weather in San Francisco. As another example, the input may include a request to brainstorm names for a flower shop, and the output may include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that may then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), may accept a large number of tokens as input (e.g., up to 2,047 input tokens), and is able to generate a large number of tokens as output (e.g., up to 2,047 tokens). GPT-3 has been trained as a generative model, meaning that it may process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system may access a remote language model (e.g., a cloud-based language model), such as ChatGPT or GPT-3, via a software interface (e.g., an application programming interface (API)). Additionally or alternatively, such a remote language model may be accessed via a network such as the internet. In some embodiments, such as, for example, potentially in the case of a cloud-based language model, a remote language model may be hosted by a computer system that may include a plurality of cooperating (e.g., cooperating via a network) computer systems that may be in, for example, a distributed arrangement. Notably, a remote language model may employ multiple processors (e.g., hardware processors such as, for example, processors of cooperating computer systems). Indeed, processing of inputs by an LLM may be computationally expensive or may involve a large number of operations (e.g., many instructions may be executed/large data structures may be accessed from memory), and providing output in a required timeframe (e.g., real time or near real time) may require the use of a plurality of processors/cooperating computing devices as discussed above.

Input(s) to an LLM may be referred to as a prompt, which is a natural language input that includes instructions to the LLM to generate a desired output. A computer system may generate a prompt that is provided as input to the LLM via an API. As described above, the prompt may optionally be processed or pre-processed into a token sequence prior to being provided as input to the LLM via its API. A prompt may include one or more examples of the desired output, which provides the LLM with additional information to enable the LLM to generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Although the present invention has been described in detail for the purpose of illustration based on what is currently considered to be the most practical and preferred implementations, it is to be understood that such detail is solely for that purpose and that the invention is not limited to the disclosed implementations but, on the contrary, is intended to cover modifications and equivalent arrangements that are within the scope of the appended claims. For example, it is to be understood that the present invention contemplates that, to the extent possible, one or more features of any implementation may be combined with one or more features of any other implementation.

The above-described implementations of the present disclosure are presented for purposes of illustration, not of limitation, and the present disclosure is limited only by the claims that follow. Furthermore, it should be noted that the features and limitations described in any one implementation may be applied to any other implementation herein, and flowcharts or examples relating to one implementation may be combined with any other implementation in a suitable manner, done in different orders, or done in parallel. In addition, the systems and methods described herein may be performed in real time. It should also be noted that the systems or methods described above may be applied to, or used in accordance with, other systems or methods.

Computing System

FIG. 7 shows an example computing system that may be used in accordance with some implementations of this disclosure. In some instances, computing system 700 is referred to as a computer system 700. A person skilled in the art may understand that those terms may be used interchangeably. The components of FIG. 7 may be used to perform some or all operations discussed in relation to FIGS. 1-7. Furthermore, various portions of the systems and methods described herein may include or be executed on one or more computer systems similar to computing system 700. Further, processes and modules described herein may be executed by one or more processing systems similar to that of computing system 700.

Computing system 700 may include one or more processors (e.g., processors 710*a*-710*n*) coupled to system memory 720, an input/output (I/O) device interface 730, and a network interface 740 via an I/O interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 700. A processor may execute code (e.g., processor firmware, a protocol stack, a database management system, an operating system, or a combination thereof) that creates an execution environment for program instructions.

A processor may include a programmable processor. A processor may include general or special-purpose microprocessors. A processor may receive instructions and data from a memory (e.g., system memory 720). Computing system 700 may be a uni-processor system including one processor (e.g., processor 710*a*) or a multiprocessor system including any number of suitable processors (e.g., processors 710*a*-710*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special-purpose logic circuitry, e.g., an FPGA (field-programmable gate array) or an ASIC (application-specific integrated circuit). Computing system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, a graphical user interface (UI) presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 700 through a wired or wireless connection. I/O devices 760 may be connected to computer system 700 from a remote location. I/O devices 760 located on remote computer systems, for example, may be connected to computer system 700 via a network and network interface 740.

The I/O device interface 730 and I/O devices 760 may be used to enable manipulation of the software quality analysis system as well. For example, the user is able to use I/O devices such as a keyboard and touchpad to indicate specific selections for validation parameters, adjust values for quality metrics, select from the history of validation results, select specific software elements or quality scores, or the like. Alternatively or additionally, the user may use their voice to indicate specific validation preferences, specific quality assessment strategies, or the like via the voice recognition device or microphones.

Network interface 740 may include a network adapter that provides for connection of computer system 700 to a network. Network interface 740 may facilitate data exchange between computer system 700 and other devices connected to the network. Network interface 740 may support wired or wireless communication. The network may include an electronic communication network, such as the internet, a LAN, a WAN, a cellular communications network, or the like.

System memory 720 may be configured to store program instructions 770 or data 780. Program instructions 770 may be executable by a processor (e.g., one or more of processors 710*a*-710*n*) to implement one or more implementations of the present techniques. Program instructions 770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 720 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static RAM (SRAM), synchronous dynamic RAM (SDRAM)), bulk storage memory (e.g., CD-ROM, DVD-ROM, hard drives), or the like. System memory 720 may include a non-transitory, computer-readable storage medium that may have program instructions stored thereon that are executable by a computer processor (e.g., one or more of processors 710*a*-710*n*) to cause the subject matter and the functional operations described herein. A memory (e.g., system memory 720) may include a single memory device or a plurality of memory devices (e.g., distributed memory devices).

I/O interface 750 may be configured to coordinate I/O traffic between processors 710*a*-710*n*, system memory 720, network interface 740, I/O devices 760, or other peripheral devices. I/O interface 750 may perform protocol, timing, or other data transformations to convert data signals from one component (e.g., system memory 720) into a format suitable for use by another component (e.g., processors 710*a*-710*n*). I/O interface 750 may include support for devices attached through various types of peripheral buses, such as a variant of the Peripheral Component Interconnect (PCI) bus standard or the Universal Serial Bus (USB) standard.

Implementations of the techniques described herein may be implemented using a single instance of computer system 700 or multiple computer systems 700 configured to host different portions or instances of implementations. Multiple computer systems 700 may provide for parallel or sequential processing/execution of one or more portions of the techniques described herein.

Those skilled in the art will appreciate that computer system 700 is merely illustrative and is not intended to limit the scope of the techniques described herein. Computer system 700 may include any combination of devices or software that may perform or otherwise provide for the performance of the techniques described herein. For example, computer system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 700 may also be connected to other devices that are not illustrated or may operate as a stand-alone system. In addition, the functionality provided by the illustrated components can, in some embodiments, be combined in fewer components or be distributed in additional components. Similarly, in some embodiments, the functionality of some of the illustrated components is not provided, or other additional functionality is available.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof mean any connection or coupling, either direct or indirect, between two or more elements; the coupling or connection between the elements may be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples; alternative implementations may employ differing values or ranges.

The teachings of the technology provided herein may be applied to other systems, not necessarily the system described above. The elements and acts of the various examples described above may be combined to provide further implementations of the technology. Some alternative implementations of the technology may not only include additional elements to those implementations noted above but may also include fewer elements.

These and other changes may be made to the technology in light of the above Detailed Description. While the above description describes certain examples of the technology and describes the best mode contemplated, no matter how detailed the above appears in text, the technology may be practiced in many ways. Details of the system may vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, either in this application or in a continuing application.

What is claimed is:

1. One or more non-transitory, computer-readable storage media storing instructions thereon for error detection and remediation in software applications, wherein the instructions, when executed by at least one data processor of a system, cause the system to:

receive, for a software application, a plurality of functional specifications and a plurality of user requirement specifications, wherein the plurality of functional specifications comprises requirements for the software application and the plurality of user requirement specifications comprises user stories that define specific outcomes;

generate, for a generative artificial intelligence model, a prompt that causes the generative artificial intelligence model to dynamically output parameters that enable error detection within a plurality of software elements generated during one or more phases of generation of the software application, wherein the parameters comprise application-specific rules based on the plurality of functional specifications and the plurality of user requirement specifications, and wherein the parameters are used for detecting errors within the plurality of software elements;

input the prompt into the generative artificial intelligence model to cause the generative artificial intelligence model to output a dynamic parameter set, each dynamic parameter of the dynamic parameter set comprising a corresponding criterion and a corresponding weighting factor;

generate, using the dynamic parameter set, a plurality of quality metrics for the plurality of software elements by evaluating, for each dynamic parameter of the dynamic parameter set, one or more of the plurality of software elements against the corresponding criterion and weighing each result of the evaluating using the corresponding weighting factor, with each quality metric indicating a conformity of a software element to a functional specification of the plurality of functional specifications or a user requirement specification of the plurality of user requirement specifications;

based on the plurality of quality metrics indicating that a particular software element fails to conform to a corresponding user requirement specification, detect an error within the particular software element of the plurality of software elements;

in response to detecting the error within the particular software element, generate, by prompting the generative artificial intelligence model using the dynamic parameter set and the particular software element, one or more modifications designed to remediate the error within the particular software element; and automatically implement the one or more modifications to the particular software element.

2. The one or more non-transitory, computer-readable storage media of claim 1, wherein the instructions further cause the system to:

detect, using a machine learning model separate from the generative artificial intelligence model, an inconsistency between the particular software element and a second software element, wherein the particular software element and the second software element are generated during different phases of the one or more phases, and wherein the particular software element is generated before the second software element; and generate, in response to detecting the inconsistency, a recommendation to modify the second software element to resolve the inconsistency with the particular software element.

3. The one or more non-transitory, computer-readable storage media of claim 1, wherein the instructions further cause the system to:

generate, based on the plurality of quality metrics, a production confidence metric that indicates a confidence level for deploying the software application to a production environment; and based on determining that the production confidence metric falls below a predetermined threshold, prevent deployment of the software application.

4. The one or more non-transitory, computer-readable storage media of claim 1, wherein the instructions further cause the system to automatically generate, using the generative artificial intelligence model and the dynamic parameter set, a subsequent dynamic parameter set for subsequent software applications having similar characteristics to the software application.

5. The one or more non-transitory, computer-readable storage media of claim 1, wherein the instructions for generating the plurality of quality metrics for the plurality of software elements further cause the system to:

generate, for the generative artificial intelligence model, a subsequent prompt that causes the generative artificial intelligence model to analyze the conformity of features of each software element in relation to a respective functional specification or a respective user requirement specification;

input, into the generative artificial intelligence model, the prompt, each software element, and the dynamic parameter set; and receive, from the generative artificial intelligence model, the plurality of quality metrics for the plurality of software elements, each quality metric indicating the conformity of the software element in relation to the respective functional specification or the respective user requirement specification.

6. The one or more non-transitory, computer-readable storage media of claim 1, wherein the instructions further cause the system to:

receive feedback data from deployment of a previously completed software application;

analyze the feedback data to identify patterns between the plurality of quality metrics and production performance following the deployment;

generate an updated set of dynamic validation parameters based on the patterns; and apply the updated set of dynamic validation parameters to validate subsequent software elements in a subsequent software application.

7. A method comprising:

receiving, for a software application, a plurality of functional specifications and a plurality of user requirement specifications;

generating, for a generative artificial intelligence model, a prompt that causes the generative artificial intelligence model to dynamically output parameters that enable error detection within a plurality of software elements generated during one or more phases of generating the software application, wherein the parameters comprise project-specific rules based on the plurality of functional specifications and the plurality of user requirement specifications;

inputting the prompt into the generative artificial intelligence model to cause the generative artificial intelligence model to output a dynamic parameter set, each dynamic parameter of the dynamic parameter set comprising a corresponding criterion and a corresponding weighting factor;

generating, using the dynamic parameter set, a plurality of quality metrics for the plurality of software elements by evaluating, for each dynamic parameter of the dynamic parameter set, one or more of the plurality of software elements against the corresponding criterion and weighing each result of the evaluating using the corresponding weighting factor, with each quality metric indicating a conformity of a software element to a functional specification or a user requirement specification;

based on the plurality of quality metrics indicating that a particular software element fails to conform to a corresponding functional specification or a corresponding user requirement specification, detecting an error within the particular software element of the plurality of software elements;

in response to detecting the error within the particular software element, generating one or more modifications designed to remediate the error within the particular software element; and automatically implementing the one or more modifications to the particular software element.

8. The method of claim 7, further comprising:

detecting, using a machine learning model separate from the generative artificial intelligence model, an inconsistency between the particular software element and a second software element, wherein the particular software element and the second software element are generated during different phases of the one or more phases, and wherein the particular software element is generated before the second software element; and generating, in response to detecting the inconsistency, a modification to the second software element to resolve the inconsistency with the particular software element.

9. The method of claim 7, further comprising:

generating, based on the plurality of quality metrics, a production confidence metric that indicates a confidence level for deploying the software application to a production environment; and based on determining that the production confidence metric falls below a predetermined threshold, preventing deployment of the software application.

10. The method of claim 7, further comprising automatically generating, using the generative artificial intelligence model and the dynamic parameter set, a subsequent dynamic parameter set for subsequent software applications having similar characteristics to the software application.

11. The method of claim 7, wherein generating the plurality of quality metrics for the plurality of software elements further comprises:

generating, for the generative artificial intelligence model, a subsequent prompt that causes the generative artificial intelligence model to analyze the conformity of features of each software element in relation to a respective functional specification or a respective user requirement specification;

inputting, into the generative artificial intelligence model, the prompt, each software element, and the dynamic parameter set; and receiving, from the generative artificial intelligence model, the plurality of quality metrics for the plurality of software elements, each quality metric indicating the conformity of the software element in relation to the respective functional specification or the respective user requirement specification.

12. The method of claim 7, further comprising:

receiving feedback data from deployment of a previously completed software application;

analyzing the feedback data to identify patterns between the plurality of quality metrics and production performance following the deployment;

generating an updated set of dynamic validation parameters based on the patterns; and applying the updated set of dynamic validation parameters to validate subsequent software elements in a subsequent software application.

13. The method of claim 7, wherein generating the one or more modifications comprises prompting the generative artificial intelligence model using the dynamic parameter set and the particular software element.

14. A system comprising:

a storage device; and one or more processors communicatively coupled to the storage device storing instructions thereon, which cause the one or more processors to:

receive, for a software application, a plurality of functional specifications and a plurality of user requirement specifications;

generate, for a generative artificial intelligence model, a prompt that causes the generative artificial intelligence model to dynamically output parameters that enable error detection within a plurality of software elements generated during one or more phases of generating the software application, wherein the parameters comprise project-specific rules based on the plurality of functional specifications and the plurality of user requirement specifications;

input the prompt into the generative artificial intelligence model to cause the generative artificial intelligence model to output a dynamic parameter set, each dynamic parameter of the dynamic parameter set comprising a corresponding criterion and a corresponding weighting factor;

generate, using the dynamic parameter set, a plurality of quality metrics for the plurality of software elements by evaluating, for each dynamic parameter of the dynamic parameter set, one or more of the plurality of software elements against the corresponding criterion and weighing each result of the evaluating using the corresponding weighting factor, with each quality metric indicating a conformity of a software element to a functional specification or a user requirement specification;

based on the plurality of quality metrics indicating that a particular software element fails to conform to a corresponding functional specification or a corresponding user requirement specification, detect an error within the particular software element of the plurality of software elements;

in response to detecting the error within the particular software element, generate one or more modifications designed to remediate the error within the particular software element; and automatically implement the one or more modifications to the particular software element.

15. The system of claim 14, wherein the instructions further cause the one or more processors to:

detect, using a machine learning model separate from the generative artificial intelligence model, an inconsistency between the particular software element and a second software element, wherein the particular software element and the second software element are generated during different phases of the one or more phases, and wherein the particular software element is generated before the second software element; and generate, in response to detecting the inconsistency, a modification to the second software element to resolve the inconsistency with the particular software element.

16. The system of claim 14, wherein the instructions further cause the one or more processors to:

generate, based on the plurality of quality metrics, a production confidence metric that indicates a confidence level for deploying the software application to a production environment; and based on determining that the production confidence metric falls below a predetermined threshold, prevent deployment of the software application.

17. The system of claim 14, wherein the instructions further cause the one or more processors to automatically generate, using the generative artificial intelligence model and the dynamic parameter set, a subsequent dynamic parameter set for subsequent software applications having similar characteristics to the software application.

18. The system of claim 14, wherein the instructions for generating the plurality of quality metrics for the plurality of software elements further cause the one or more processors to:

generate, for the generative artificial intelligence model, a subsequent prompt that causes the generative artificial intelligence model to analyze the conformity of features of each software element in relation to a respective functional specification or a respective user requirement specification;

input, into the generative artificial intelligence model, the prompt, each software element, and the dynamic parameter set; and receive, from the generative artificial intelligence model, the plurality of quality metrics for the plurality of software elements, each quality metric indicating the conformity of the software element in relation to the respective functional specification or the respective user requirement specification.

19. The system of claim 14, wherein the instructions further cause the one or more processors to:

receive feedback data from deployment of a previously completed software application;

analyze the feedback data to identify patterns between the plurality of quality metrics and production performance following the deployment;

generate an updated set of dynamic validation parameters based on the patterns; and apply the updated set of dynamic validation parameters to validate subsequent software elements in a subsequent software application.

20. The system of claim 14, wherein the instructions for generating the one or more modifications further cause the one or more processors to prompt the generative artificial intelligence model using the dynamic parameter set and the particular software element.

* * * * *